(12) United States Patent
Schmitt

(10) Patent No.: US 8,479,402 B2
(45) Date of Patent: Jul. 9, 2013

(54) LOCKABLE ADJUSTING DEVICE FOR ADJUSTING A RETICLE DEVICE

(75) Inventor: Christoph Schmitt, Schriesheim (DE)

(73) Assignee: Schmidt & Bender GmbH & Co. KG, Biebertal (DE)

( * ) Notice: Subject to any disclaimer, the term of this patent is extended or adjusted under 35 U.S.C. 154(b) by 325 days.

(21) Appl. No.: 12/907,356

(22) Filed: Oct. 19, 2010

(65) Prior Publication Data

US 2011/0261449 A1 Oct. 27, 2011

(30) Foreign Application Priority Data

Oct. 20, 2009 (DE) .......................... 10 2009 050 089

(51) Int. Cl.
*F41G 1/38* (2006.01)
(52) U.S. Cl.
USPC ............................................. 33/298; 359/428
(58) Field of Classification Search
USPC ..................... 33/297, 298; 359/424, 427, 428
See application file for complete search history.

(56) References Cited

U.S. PATENT DOCUMENTS

| | | | | |
|---|---|---|---|---|
| 3,902,251 A | * | 9/1975 | Ross ............................... | 33/298 |
| 4,395,096 A | * | 7/1983 | Gibson .......................... | 359/422 |
| 5,363,559 A | * | 11/1994 | McCarty ........................ | 33/298 |
| 6,442,854 B1 | * | 9/2002 | Liu et al. ........................ | 33/298 |
| 2002/0159148 A1 | * | 10/2002 | Huber ............................ | 359/428 |
| 2009/0109529 A1 | * | 4/2009 | Robitaille ..................... | 359/428 |
| 2009/0205461 A1 | | 8/2009 | Windauer | |
| 2011/0199677 A1 | * | 8/2011 | Schick et al. ................. | 359/428 |
| 2011/0279894 A1 | * | 11/2011 | Schick et al. ................. | 359/428 |

FOREIGN PATENT DOCUMENTS

| | | |
|---|---|---|
| AT | 414 167 | 9/2006 |
| DE | 297 20 737 | 2/1998 |
| WO | 2006/060490 | 6/2006 |

* cited by examiner

*Primary Examiner* — G. Bradley Bennett
(74) *Attorney, Agent, or Firm* — Clark & Brody

(57) ABSTRACT

A setting assembly to adjust components linked to it, in particular to adjust the reticle of a sighting telescope, comprising an adjustment cap system which is rotationally supported on a coupling and which drives said setting assembly, said coupling being designed to transmit adjustment cap system displacements to components that can be connected to the coupling in order to transmit their setting(s) and a first locking element mounted on the coupling being able to engage a second locking element in a way that the position of the adjustment cap system can be fixed in place relative to the coupling. The first locking element is an at least segment-wise externally toothed collar and the second locking element is an at least segment-wise internally toothed locking ring. A resiliently supported detent at the coupling may engage by detent recesses an associated detent ring at the adjustment cap system.

14 Claims, 2 Drawing Sheets

LOCKABLE ADJUSTING DEVICE FOR ADJUSTING A RETICLE DEVICE

The present invention relates to a setting assembly driving components linked to it, in particular to adjust a telescopic sighting reticle.

Such setting assemblies are preferentially used in precision implements such as optical instruments, telescopic sights and the like. Illustratively the German patent document 297 207 37 U1 discusses a telescopic sight having a tubular housing comprising tubular seats/mounts for an ocular and objective sub-assembly. A central tube comprises an optical reversing device and a reticle associated with latter and firmly affixed in a seat of the said dual tube.

A minimum of two adjustment turrets circumferentially 90 degrees from each other are affixed externally to telescopic sight and are fitted with a detent ring or an adjustment cap. A threaded drive element is guided within the slot of the tubular case and, against an opposing spring force, presses at its front against the said optical reversing device. Said drive element may be moved back and forth longitudinally by rotating the detent ring resp. the adjusting cap.

In the state of the art, such a detent ring—which may rotate approximately through 360°—is finely pitched, resulting in a resolution by one step when being rotated (clicked-in) each time by one step, so that the target impact site initially at 100 m is changed by 10 mm. Moreover a scale is mounted on the outside of the adjustment turret, allowing reading the applied correction. Depending on the pitch, for instance each click is marked by one white line, and each tenth click is indicated by a number.

As regards sharpshooters or other applications, in particular as regards firing ranges up to 2,000 m, a click pitch, that is a single click, will relate to a target site offset of up to 200 mm. Accordingly the adjusted position of the reticle must be accurately known to the shooter. The said scale may be used during the day for such purposes.

To check the setting in the dark in controlled manner, the user must detect the number of clicks to a desired setting or to the affixation of the setting assembly by touch or sensomotorically, that is, the user senses each click and may infer from the number of clicks which setting belongs to the number of setting procedures.

As regards a fine pitch (namely the number of detent positions per unit length), hence a large range of adjustment, there is danger the user shall make mistakes in counting, so that reliability is lost. In particular adjustment ranges not limited to one excursion through them, that is, allowing passing through them repeatedly, for instance settings/detents fitted on discoid or planar elements, there will be the possibility that the user shall make a mistake on account of the large number detent steps.

In practice, however, the marksman frequently knows the last distance he fired at, and therefore the reticle setting. Based on that position the new shooting distance might be made relative to the earlier one.

In this respect the solutions of the state of the art however incur the drawback that when the shooter changes his position, the reticle might be shifted unintentionally. Such shifting might occur when clothing rubs against the adjustment caps.

Accordingly it is the object of the present invention to create a setting assembly driving components linked to it, in particular to adjust a sighting telescope reticle, said setting assembly being secured against unintentional adjustment and against the ensuing spurious settings, and also being reliably operable by user in the dark. Appropriately said sighting telescope offers simplicity of design, advantageous manufacture, ruggedness and long service life.

This object is attained by a setting assembly defined in claim 1. A setting assembly of the present invention—to adjust components that may be hooked to it, in particular to drive a sighting telescope's reticle, comprising an adjustment cap rotatably supported on a coupling to drive the setting assembly, where the coupling is designed to transmit the adjustment cap system's motion to the components linked to said coupling—provides that a first locking element mounted on the coupling may engage a second locking element in a way that the position of the adjustment cap system can be locked in place relative to said coupling.

Components linkable to the setting assembly in particular may be optical aiming devices such as sighting telescopes. To link the setting assembly to said components, the invention provides a coupling. Illustratively this coupling may be a threaded pin resting within a bush. However other solutions transducing a setting assembly's rotary motion into an adjustment motion may also be construed being a coupling. An adjustment cap system is provided in the present invention to drive the setting assembly and rests rotatably on the said coupling. The rotation of the adjustment cap system is transmitted by the coupling to the component to be adjusted.

The present invention offers the advantage that a locking element configured at the coupling element does not engage the inside of mechanism of this element. Instead the full design space within the coupling element remains available for other technical uses. For instance said inside may house complex detents.

In a further design of the present invention, the first locking element is in the foini of an externally toothed locking collar. This feature allows even more installation space at the coupling element because the detent teeth point toward the adjustment cap system. An internal locking element no longer is necessary. The geometry of a circumferential collar furthermore offers the advantage that the torsional stresses due to acting on the adjustment cap shall be spread as homogeneously as possible onto the coupling element. Again, when the locking element is a locking collar, a very large number of positions may be engaged.

In an especially preferred embodiment of the present invention, the second locking element is an internally threaded ring. The torsional stresses acting on the adjustment cap may be spread as homogeneously as possible. By designing the locking element as a ring, an almost arbitrary large number of positions may be entered.

A further improvement to the setting assembly is in the form of a resiliently supported detent at the coupling element, this detent allowing matching engagement with the detent recesses in a detent ring of the adjustment cap system. This feature drastically facilitates driving the setting assembly. By means of the detent device constituted by the detent element and the detent recess, the user is able both to feel and hear the detent action. Each detent procedure therefore is associated with a particular setting.

In a further embodiment of the present invention, the locking ring and the detent ring are fitted with the same detent pitch. As a result substantially identical ring blanks can be used. Lower storage costs reduce production costs Advantageously the locking ring is secured by a dowel against rotation relative to the detent ring. This dowel makes sure that the rings always shall be opposite the same detent toothing. As a result, the detents of the inner toothing of the detent ring as well as of the locking ring are always aligned.

Accordingly, the set position shall be fixed even when moving the locking pin on the locking collar, accurate positioning being secured.

Preferably the locking action is axially displaceable on the dowel in controlled manner. As a result, additional locking ring guidance is unnecessary. Said dowel translates the locking ring relative to the detent ring but precludes rotational displacement. This simple feature makes it possible that the locking ring toothing can always slide in proper relative position on locking collar. In a further design mode, the dowel is affixed to the adjustment cap system. Such affixation illustratively is by compression or bonding. In this way there is a further reduction in parts, resulting in lower overall production costs of the setting assembly.

In one embodiment mode of the present invention, the locking ring is affixed to an axially displaceable bush. This bush advantageously facilitates operating the locking ring. When this locking ring is affixed to a bush, it may be externally displaced from the outside into its position. When the bush is forced down by the marksman, the locking ring slides onto the locking collar. By means of the dowel—which precludes relative rotation between the locking ring and the detent ring—the adjustment cap system is reliably prevented from unintended rotation. When the bush is pulled upward, the locking ring is pulled off the locking collar and guided toward the detent ring. Now the detent ring and the locking ring may again be displaced by the adjustment cap system.

Alternatively the locking ring may be displaced in other ways. Driving it using a bush moreover precludes dust or soiling matter from entering the locking mechanism, as the mechanism as a whole may be encapsulated. In another version, the locking ring might also be designed to being gripped and hence displaced by the marksman.

The bush is fitted with a protrusion to permit easier operation by the marksman. This feature allows simple and reliable operation even when gloves are worn by said marksman. In this way said protrusion constitutes a handling accessory.

In an especially advantageous design of the present invention, detent elements are configured at the bush and cooperate with a detent element at the adjustment cap system in a way to allow locking into different detent positions. Said detent elements enable the marksman to sense the position wherein the locking ring is reliably seated on the locking collar or respectively reliably releasing it. The marksman is able to perceive by touch said locking even at night.

Seals preferably are configured between the bush and the adjustment cap system to preclude dust, water and soiling agents from penetrating between the bush and the adjustment cap system. When additional seals are configured between the bush and the coupling, then all internal parts of the setting assembly will be protected against ambient effects from dust, water and soiling materials.

In principle the locking collar is irrotationally affixed by a pin and associated recesses. However the locking collar also may be bonded to the coupling, but such adhesive bonds become brittle in time due to being constantly stressed. The pin and the recesses reliably affix the locking collar into its position relative to the coupling over the full service life of said setting assembly.

Further features, particulars and advantages of the present invention are defined in the claims and in the following discussion of various embodiments in relation to the appended drawings.

Figure 1:
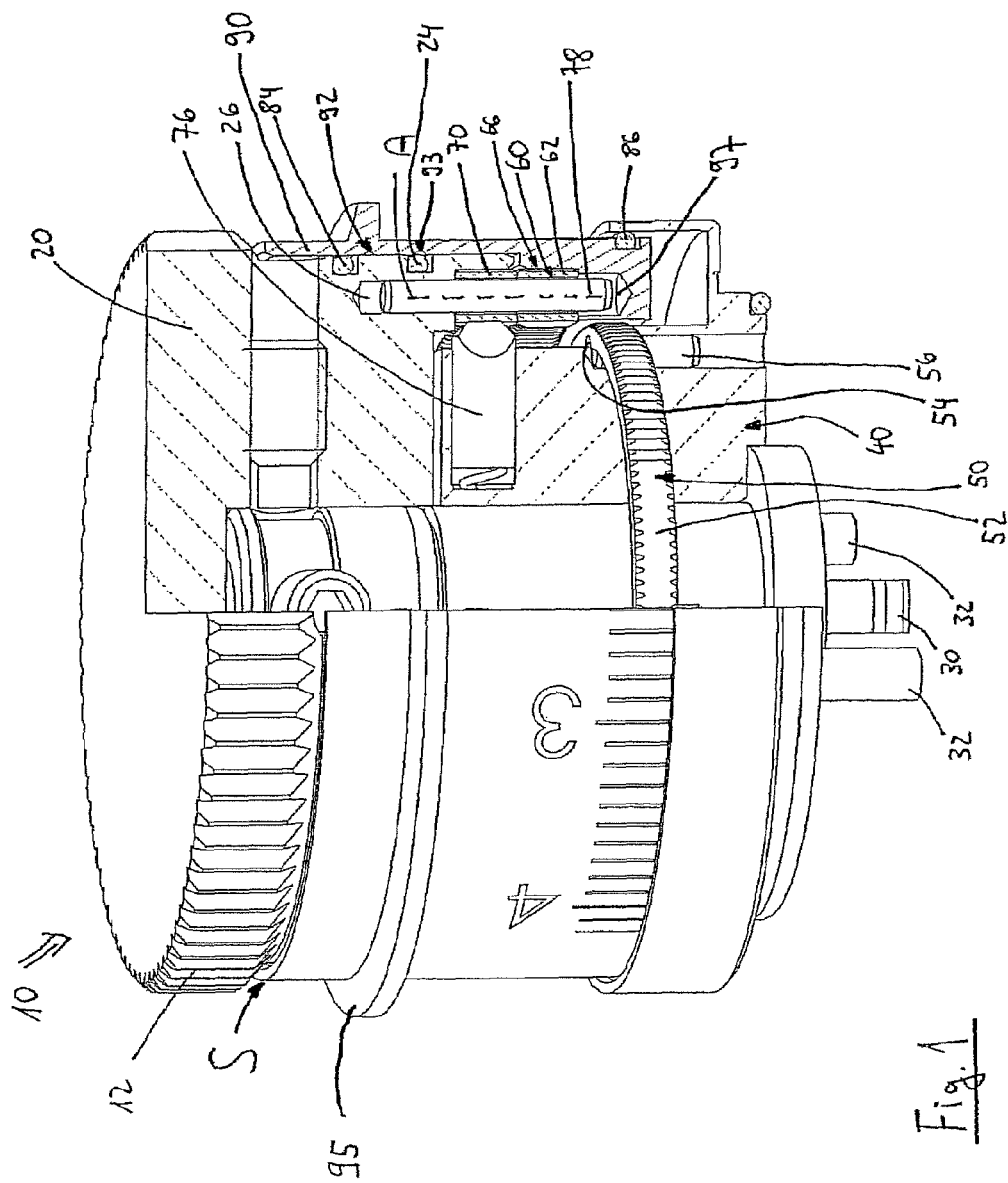
FIG. 1 shows a setting assembly of the invention in the unlocked position.

FIG. 1 shows a setting assembly 10 to adjust components linked to it, in particular to set a reticle of a sighting telescope, said assembly comprising an adjustment cap system 20 which is rotatably supported on a coupling 40 and which drives the setting assembly 10, the coupling 40 being designed to transmit a motion of the adjustment cap system 20 to the components which can be linked to the said coupling 40 in order to set/adjust these components, a first locking element 50 configured at the coupling 40 being able to engage a second locking element 60 in a manner that the position of the adjustment cap system 20 is thereby fixed in place relative to the coupling 40.

The first locking element 50 is an externally toothed locking ring 52 whereas the second locking element 60 is an internally toothed locking 62. A resiliently supported detent 76 at the coupling 40 can correspondingly engage by means of detent recesses a detent ring 70 at the adjustment cap system 20.

The locking ring 62 and the detent ring 70 are fitted with the same detent pitch. A dowel 78 rotatably secures the locking ring 62 against rotation. The locking ring 70 is guided for this purpose on said dowel in an axially displaceable manner along an axis A. This dowel 70 is affixed in a borehole 26 of the adjustment cap system 20.

FIG. 1 shows furthermore that the locking ring 62 is affixed to an axially displaceable bush 90. The bush 90 is appropriately fitted with a contact surface 66 to which the locking ring 62 is connected frictionally. A recess 97 such as a blind hole or the like is subtended within the bush 90 to receive insofar as needed the dowel 78 when the locking ring 62 is displaced along the axis A into the unlocked position. The bush 90 also is fitted with a protrusion 95. Detents 92, 93 configured at the muff each can be affixed by a detent 24 to the adjustment cap system 20.

Seals 84 are configured between the bush 90 and the adjustment cap system 20. Further seals 86 are used between the bush 90 and the coupling 40. The locking collar 52 is secured against rotation to the coupling 40 by means of a pin 56 and by a matching recess 54. FIG. 1 also shows the drive 30 and threaded tube connections 32.

FIG. 1 furthermore shows that the gap S between the bush 90 and the knurled wheel 12 is almost fully closed. In this unlocked position, the locking ring 62 is shifted along the dowel 78 toward the detent ring 70 and is disengaged from the locking collar 52. The detent 93 is in register with the detent 24 and precludes unintentionally shifting the bush 90. The unlocked (operational) position is in effect and accordingly the adjustment cap system is operable.

Figure 2:
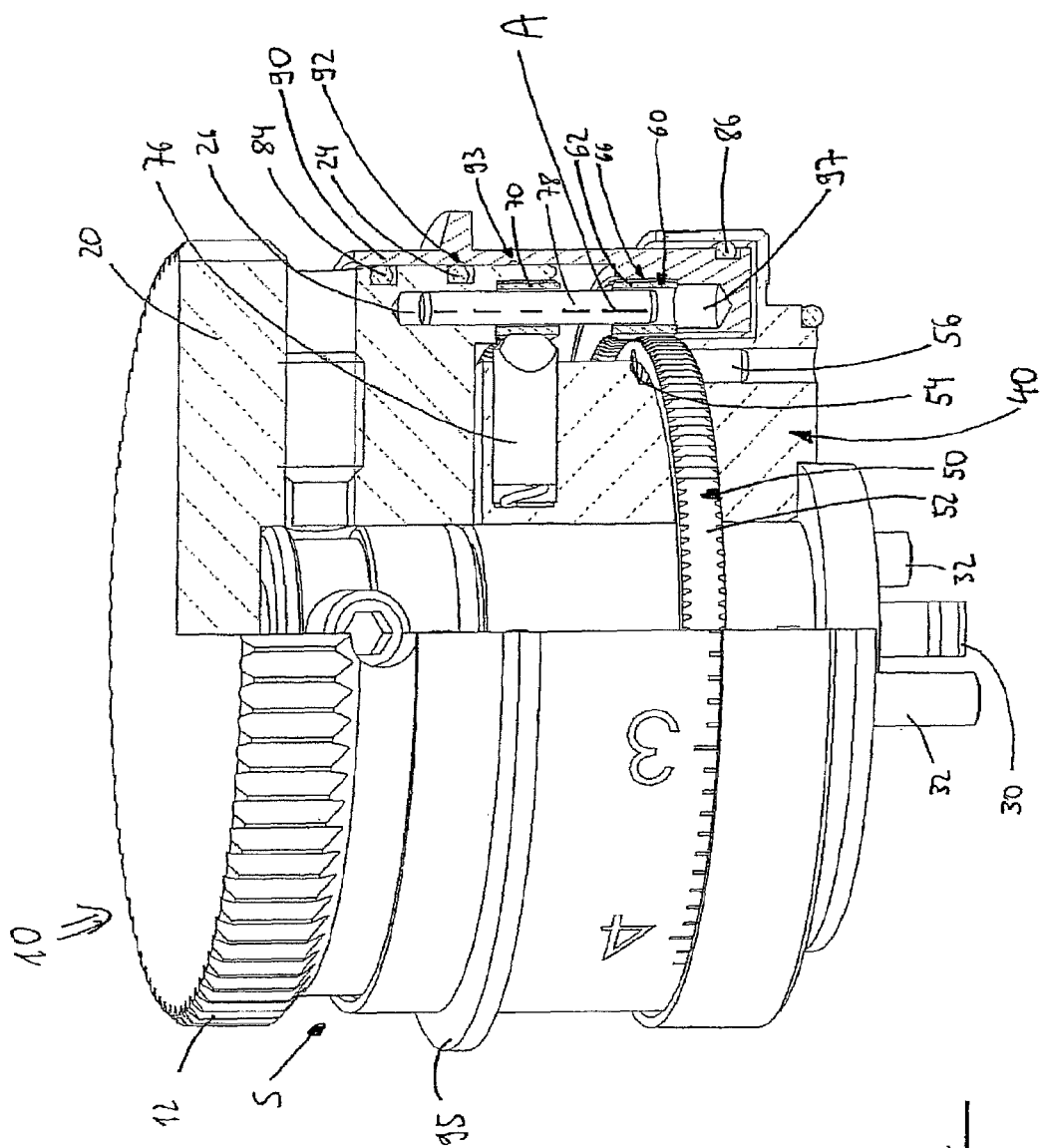
FIG. 2 shows a setting assembly of the invention in the locked position.

FIG. 2 shows the same setting assembly in the locked position. The gap S between the bush 90 and the knurled wheel 12 is considerably widened. Moreover a label might be apposed on the adjustment cap system 20. In this locked position, the locking ring 62 has been displaced along the dowel 78 toward the locking collar 52. The locking ring 62 fully encloses the locking collar 52 in the present embodiment mode. However a similar effect may be attained using segments.

The toothing of the locking collar 52 engages the toothing of the locking ring 62 and prevents unintentionally rotating the adjustment cap system 20. The detent 92 is matched to the detent 24 and precludes unintentionally shifting the bush 90. The locked position is in effect, the adjustment cap system 20 is inoperable.

The present invention is not limited to one of the embodiment modes above but instead it may be modified in many ways.

All features and advantages, inclusive design details, spatial configurations and procedural steps, implicit and explicit in the claims, specification and the drawings, may be construed being inventive per se as well as in arbitrary combinations.

LIST OF REFERENCE SYMBOLS 10 setting assembly
12 knurled wheel
20 adjustment cap system
24 detent
26 borehole
30 drive
32 threaded tube affixation
40 coupling
50 first locking element
52 locking collar
60 second locking element
62 locking ring
66 contact surface
70 detent ring
76 detent
78 dowel
84, 86 seals
90 bush
92 locked position detent
93 operating position detent
95 protrusion
97 recess
A axis A
S gap

The invention claimed is:

1. A setting assembly (10) to drive components linkable to it, in particular to set a reticle of a sighting telescope, comprising an adjustment cap system (20) which is rotatably supported by a coupling (40) and which drives the said setting assembly, the coupling (40) being designed to transmit the displacements of the adjustment cap system (20) to components linkable to the coupling (40) to adjust said components, characterized
in that a first locking element (50) configured at the coupling (40) may engage a second locking element (60) in a manner that the position of the adjustment cap system (20) is locked in place relative to the coupling (40).

2. The setting assembly (10) as claimed in claim 1, characterized in that the first locking element (50) is a locking collar (52) with an external toothing and present at least in segments.

3. The setting assembly (10) as claimed in claim 1, characterized in that the second locking element (60) is a locking ring (62) with an internal toothing and present at least in segments.

4. The setting assembly (10) as claimed in claim 1, characterized in that a resiliently supported detent (76) at the coupling (40) may correspondingly engage a detent ring (70) at the adjustment cap system (20).

5. The setting assembly (10) as claimed in claim 4, characterized in that the locking ring (62) and the detent ring (70) are fitted with the same detent pitch.

6. The setting assembly (10) as claimed in claim 4, characterized in that the locking ring (62) is irrotationally supported by a dowel (78) relative to the detent ring (70).

7. The setting assembly (10) as claimed in claim 6, characterized in that the locking ring (62) can be guided in axially displaceable manner along the dowel (78).

8. The setting assembly (10) as claimed in claim 6, characterized in that the dowel (78) is affixed to the adjustment cap system (20).

9. The setting assembly as claimed in claim 3, characterized in that the locking ring (62) is affixed to an axially displaceable bush (90).

10. The setting assembly (10) as claimed in claim 9, characterized in that the axially displaceable bush (90) is fitted with a protrusion (95).

11. The setting assembly (10) as claimed in claim 9, characterized in that detents (92, 93) are configured on the axially displaceable bush (90) and cooperate in a manner with a detent (24) at the adjustment cap system (20) so that different detent positions may be implemented.

12. The setting assembly (10) as claimed in claim 9, characterized in that seals (84) are configured between the axially displaceable bush (90) and the adjustment cap system (20).

13. The setting assembly (10) as claimed in claim 12, characterized in that seals (84) are configured between the axially displaceable bush (90) and the coupling (40).

14. The setting assembly (10) as claimed in claim 2, characterized in that the locking collar (52) is irrotationally affixed by a pin (56) and corresponding recesses (54) to the coupling (40).

* * * * *